US008239678B2

(12) United States Patent
Cuellar et al.

(10) Patent No.: US 8,239,678 B2
(45) Date of Patent: Aug. 7, 2012

(54) METHOD FOR COMBINING DATA TO BE PROCESSED WITH A DATA-SPECIFIC APPARATUS, AND APPARATUS AND COMPUTER PROGRAM FOR IMPLEMENTING THE METHOD

(75) Inventors: Jorge Cuellar, Baierbrunn (DE); Hans-Georg Köpken, Erlangen (DE); Matthias Lenord, Bubenreuth (DE); Monika Maidl, München (DE)

(73) Assignee: Siemens Aktiengesellschaft, München (DE)

( * ) Notice: Subject to any disclaimer, the term of this patent is extended or adjusted under 35 U.S.C. 154(b) by 361 days.

(21) Appl. No.: 12/614,783

(22) Filed: Nov. 9, 2009

(65) Prior Publication Data
US 2010/0122086 A1      May 13, 2010

(30) Foreign Application Priority Data
Nov. 10, 2008   (EP) .................................... 08019636

(51) Int. Cl.
*H04L 29/06* (2006.01)
(52) U.S. Cl. .............................. 713/167; 380/28; 380/44
(58) Field of Classification Search .................. 713/167; 380/28, 44; 705/56, 58, 901–907, 911–912
See application file for complete search history.

(56) References Cited

U.S. PATENT DOCUMENTS

| | | | |
|---|---|---|---|
| 7,822,685 B1* | 10/2010 | O'Toole, Jr. .................... | 705/51 |
| 2003/0123665 A1 | 7/2003 | Dunstan | |
| 2005/0044361 A1* | 2/2005 | Chang et al. .................. | 713/167 |
| 2006/0136341 A1* | 6/2006 | Wajs ............................... | 705/57 |
| 2006/0294018 A1* | 12/2006 | Tuoriniemi ..................... | 705/59 |
| 2007/0116288 A1* | 5/2007 | Rasizade et al. .............. | 380/258 |
| 2007/0219921 A1* | 9/2007 | Lee et al. ........................ | 705/59 |
| 2008/0109366 A1* | 5/2008 | Read .............................. | 705/58 |
| 2008/0288771 A1* | 11/2008 | Kulakowski et al. .......... | 713/150 |

(Continued)

FOREIGN PATENT DOCUMENTS

| | | |
|---|---|---|
| WO | WO 98/42098 A1 | 9/1998 |
| WO | WO 03/012603 A2 | 2/2003 |

OTHER PUBLICATIONS

Jürgen Nützel and Anja Beyer; Emerging Trends in Information and Communication Security Lectiure Notes in Computer Science; Lncs, Springer, Berlin, DE; Bd. 3995, Jan. 1, 2006; Seiten 368 bis 380; XP019034226; ISBN: 978-3-540-34640-1; Others.

(Continued)

*Primary Examiner* — Hadi Armouche
(74) *Attorney, Agent, or Firm* — Henry M. Feiereisen; Ursula B. Day (57) ABSTRACT

A method and a system for combining data with an apparatus which is provided for processing the data includes the following steps: (a) determining an identifier associated with the apparatus; (b) generating a first key by using the identifier and a second secret key, which is independent of the identifier; (c) generating a decryption algorithm to be used for the second key and providing the decryption algorithm to the apparatus; (d) encrypting a rights object, which allows access to the data, using the first key and the second secret key; (e) transmitting the data and the rights object to the apparatus; (f) decrypting the rights object with the apparatus by using the identifier associated with the apparatus and the decryption algorithm associated with the apparatus; and (g) decrypting the data using a key selected by a rights owner and included in the decrypted rights object.

13 Claims, 4 Drawing Sheets

U.S. PATENT DOCUMENTS

2010/0122352 A1*  5/2010  Cuellar et al. .................. 726/30
2010/0146598 A1*  6/2010  Cuellar et al. .................... 726/4

OTHER PUBLICATIONS

Stanley Chow et al. SAC 2002, LNCS, Bd. 2595, Jan. 1, 2003; Seiten 250 bis 270; XP 002462505, Springer, Berlin Heidelberg; Others.

Qiong Liu et al. Conference in Research and Practice in Information Technology, XX,XX, Bd. 21; Dec. 31, 2003; Seiten 1 bis 10; XP002454044; Others.

Sam Michiels at al. Proceedings of the 5th. ACM Workshop on digital rights management. DRM'05, Alexandria, VA, Nov. 7, 2005; New York, NY; Seiten 65-74 XP001503028; ISBN: 978-1-59593-230-3; Others.

* cited by examiner

METHOD FOR COMBINING DATA TO BE PROCESSED WITH A DATA-SPECIFIC APPARATUS, AND APPARATUS AND COMPUTER PROGRAM FOR IMPLEMENTING THE METHOD

CROSS-REFERENCES TO RELATED APPLICATIONS

This application claims the priority of European Patent Application, Serial No. EP 08019636, filed Nov. 10, 2008, pursuant to 35 U.S.C. 119(a)-(d), the content of which is incorporated herein by reference in its entirety as if fully set forth herein.

BACKGROUND OF THE INVENTION

The invention relates to a method for combining data with an apparatus which is provided for processing the data. The data to be combined with the apparatus include, particularly as intellectual property of a rights owner, a product description or the like. The combination of the respective data with the apparatus is intended to ensure that the data can only be used on the respective apparatus or in conjunction with the respective apparatus. Such a combination protects the intellectual property of the rights owner against unauthorized use, replication and so on.

The following discussion of related art is provided to assist the reader in understanding the advantages of the invention, and is not to be construed as an admission that this related art is prior art to this invention.

Previous approaches to solving this problem have been based on the use of special hardware which is protected against access by unauthorized parties. In such a scenario, the data to be transmitted can be protected using a method such as is known from Digital Rights Management (DRM). In this case, a rights owner generates at least one "rights object" so that he can commission a service provider to perform activities which he cannot or does not wish to perform himself without losing control of his intellectual property. For the use of such rights objects, the service provider first of all generates a key pair, and a first key portion is transmitted to the rights owner, while the second key portion remains with the service provider. The rights owner for his part generates a key which is unknown to the service provider and embeds it into a rights object. Finally, the rights object is encrypted using the key portion received from the service provider, so that the service provider, upon receiving the rights object, can decrypt it using its key portion and is thus provided with access to the key contained in the rights object. This key in turn allows access to the data.

Such an approach would leave the key and the data in unencrypted form on the apparatus, however. A hacker gaining access to the respective apparatus can therefore obtain the data and/or the key and use the respective data, or possibly even use the key to gain access to other data. The same also applies to the service provider itself if it has only restricted rights, or to its staff. Direct access to the file would bypass the restrictions. To prevent this, special hardware for the respective apparatus has previously been contemplated which is protected against unauthorized access by third parties, so that third parties, that is to say neither a hacker nor the service provider, gain neither access to the data nor the key in such a case. A piece of hardware with such access protection is also referred to a "tamper-proof". However, such hardware or functionality implementing the access protection in such a piece of hardware is expensive.

It would therefore be desirable and advantageous to address this problem and to obviate other prior art shortcomings by providing a method for combining data with an apparatus in which no special hardware is required for adequate protection.

SUMMARY OF THE INVENTION

According to one aspect of the present invention, a method for combining data with an apparatus for processing the data is provided with the following steps: determining an identifier which relates to the apparatus in a manner of a fingerprint. Generating a first and a second key, wherein the first key is generated using the identifier/the fingerprint and the second or further key, as a secret key, is independent of the fingerprint. Generating a decryption algorithm which is provided for use of the second, secret key and providing the decryption algorithm for the apparatus too. Encrypting a rights object, which allows access to the data, using the first key and the second, secret key on which the decryption algorithm is based. Transmitting the data and the rights object to the apparatus. Decrypting the rights object by means of the apparatus using the first key generated from the identifier and using the decryption algorithm which is provided for the apparatus separately and finally decrypting the data using a key which the decrypted rights object comprises.

An advantageous feature of the invention is two-stage encryption of the rights object transmitted to the respective apparatus. In this case, the first encryption is performed using the first key, which can be attributed to the identifier (the fingerprint) which relates to the apparatus, that is to say an identifier which makes the respective apparatus distinguishable from other apparatuses. The second encryption is performed using a second, secret key, wherein the secret key has a decryption algorithm generated for it which is provided for the respective apparatus separately. The first key is used for linking to the apparatus, and the second key, which needs to remain secret, is used for protecting the data. The apparatus, that is to say a production means for performing the service commissioned by the rights owner, can decrypt the received rights objects using the identifier thereof and using the separately provided decryption algorithm. A third party gaining unauthorized access to the apparatus can possibly read the identifier thereof, but nevertheless is not provided with access to the data which are on the apparatus, because knowledge of the identifier at most allows a first stage of the encryption to be lifted, and access is not possible without also lifting the second stage of the encryption, which requires the use of the decryption algorithm.

The second, secret key could be obtained by a hacker by stealing or copying a memory on which the decryption algorithm of the apparatus is provided, that is to say a flash memory or the like, for example. This also requires physical access. For the service provider itself, which has unhindered access to its apparatuses, that is to say including the flash memory, the approach thus only affords significant technical complication compared with direct access to the program. In this case, it is important for data sent to a drive mechanism, for example, to be calculated nominal positions, that is to say not a complete NC program. This means that direct access to the data for an individual drive mechanism need not be regarded as a severe threat. Instead, the invention is based on the fact that the data, that is to say nominal positions, for example, are linked to one particular drive mechanism. This is meant to make it much more difficult for the service provider to execute the same program on a different machine again, and thereby bypass a restriction for a prescribed production volume.

According to another advantageous feature of the invention, the decryption algorithm itself, which is provided for the apparatus, may include the underlying, second and secret key in hidden form. As a result, the event of unauthorized access to the apparatus the key is not directly identifiable as such, and also the key is not readily available in the event of possible unauthorized reading of the decryption algorithm. In this case, the key may advantageously be hidden in the decryption algorithm using what are known as white-box cryptography methods. This approach concerns itself specifically with the situation in which a key needs to be stored at a location for which it is not possible to guarantee security, that is to say in this case because both the service provider and its personnel have access to the or each respective apparatus, for example. When these approaches are used to hide the key in the decryption algorithm, it is thus possible to assume a high level of security for the key.

According to another advantageous feature of the invention, the decryption algorithm may be transferred to a memory, for example what is known as a flash memory, particularly a flash EPROM, which can be combined with the respective apparatus and to be provided for the apparatus by means of connection of such a memory. When the decryption algorithm has been generated independently of the apparatus, it can advantageously be combined directly with the respective apparatus by means of transfer to a memory, without this requiring the existence of a communicative connection between the functionality undertaking the generation of the decryption algorithm and the respective apparatus, which could be possibly be attacked separately by a third party.

According to another advantageous feature of the invention, the decryption algorithm may be executed only on an apparatus with an identifier which has the identifier used for the encryption. This feature of the invention ensures that even if an unauthorized third party obtains, e.g. steals or copies, the decryption algorithm, it nevertheless cannot execute it if a piece of hardware used for this purpose does not have the same identifier as the apparatus for which the decryption algorithm was originally provided. If the identifier used was suitable fingerprint data, e.g. an explicit MAC address or the like, there is a high level of certainty in the assurance that the third party cannot execute the decryption algorithm or can execute it only with an excessively high level of complexity.

Advantageously, the apparatus with which the respective data are combined in the manner described above to protect against unauthorized access may be a drive mechanism. The data are then control data for actuating this drive mechanism in respect of nominal values, such as speed, position, situation and so on. In such a scenario where at least individual apparatuses are drive mechanisms, data which embody intellectual property of a rights owner may be present in a comparatively production-specific form, i.e., in the form of nominal values, for example, directly on the individual apparatuses, without having to be concerned that in the event of unauthorized access thereto the respective intellectual property will pass directly to third parties or that a program with such data will be able to be executed on another apparatus, e.g. with the intention of bypassing stipulated volume restrictions.

The described method may be performed firstly by a rights agent and secondly by a functionality implemented on the respective apparatus. Hence, the aforementioned aspect of the invention is also achieved by the rights agent and the functionality implemented on the respective apparatus. As far as the rights agent is concerned, this is a functionality for performing those steps of the method which are not performed on the part of the respective apparatus. The rights agent thus includes means for determining an identifier which relates to the apparatus, means for determining an identifier which relates to the apparatus in a manner of a fingerprint, means for generating a first and a second key, wherein the first key is generated using the identifier, and the second key, as a secret key, is independent of the identifier, the means for generating a decryption algorithm which is provided for use of the second and secret key and for providing the decryption algorithm for the apparatus too, and also means for encrypting a rights object, which allows access to the data, using the first key and the second, secret key on which the decryption algorithm is based, and also means for transmitting the data and the rights object to the apparatus. In respect of the advantages of this aspect of the invention, reference is made to the advantages mentioned further above in connection with the discussion of the method. Provision is particularly advantageously made for the functionality, that is to say the rights agent, as a unit dedicated to rights management, to act particularly as a decentralized network component in a production environment with a plurality of apparatuses/production means.

The functionality of the apparatus for performing the relevant steps of the method stated at the outset may include means for decrypting the rights object using the key generated from the identifier of the respective apparatus and using the decryption algorithm provided for the apparatus and also means for decrypting the data using a key which the decrypted rights object includes.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the Figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
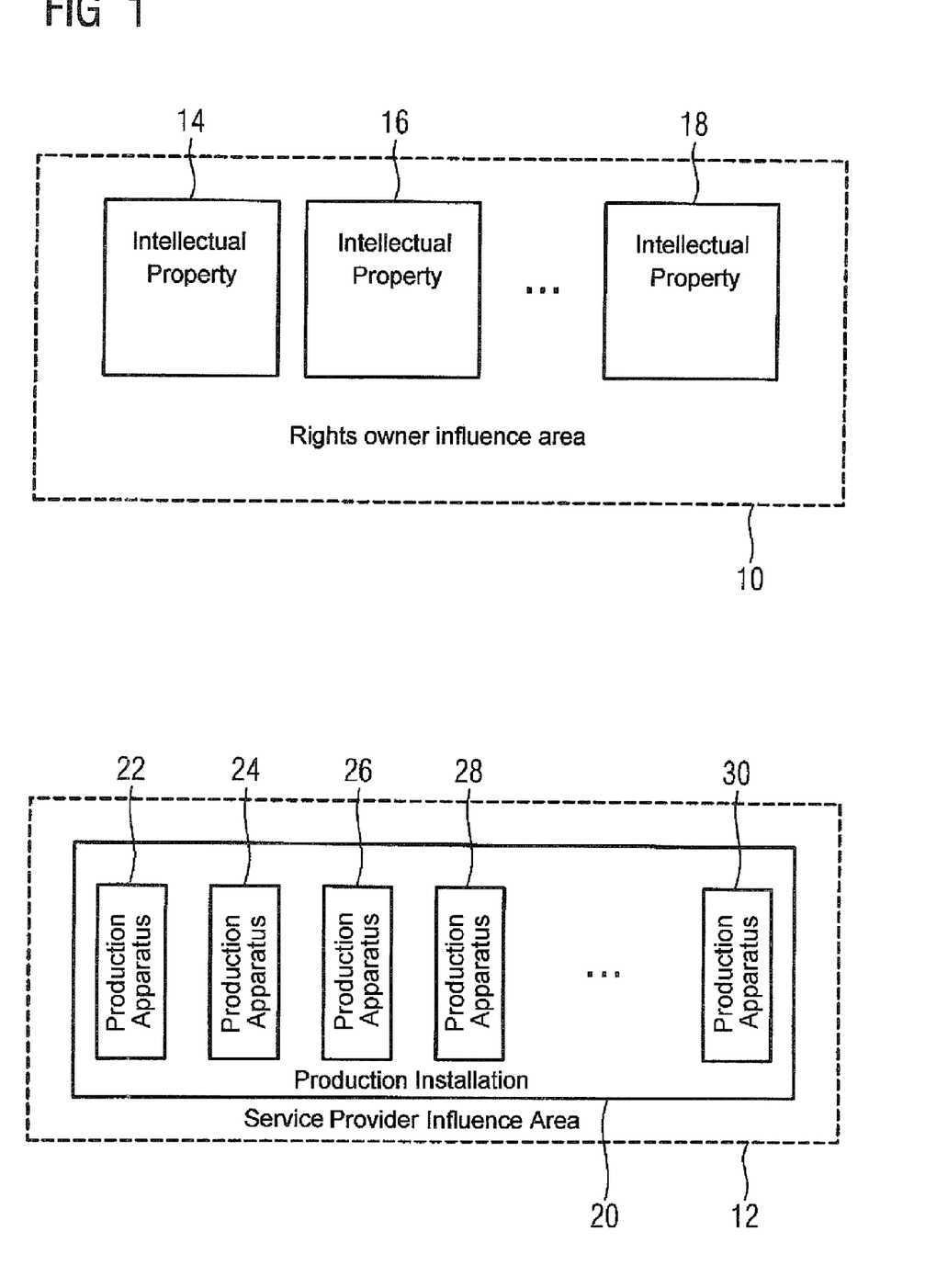
FIG. 1 shows in form of a schematic diagram a rights owner influence area with intellectual property of the rights owner and a service provider influence area for producing goods commensurate with the intellectual property rights according to the present invention.

Turning now to the drawing, and in particular to FIG. 1, there is shown a schematic diagram of a rights owner influence area 10 (top part) and a service provider influence area 12 (bottom part). In its influence area 10, the rights owner has intellectual property 14, 16, 18, e.g. blueprints with dimensions and the like, for the manufacture of a product, e.g. an automotive part. The scenario assumed is intended to be based on the rights owner not being able to or wanting to manufacture the product himself. To this end, part of the intellectual property 14-18 of the rights owner therefore needs to be transmitted to a service provider. In its influence area 12, the service provider has a production installation 20, for example, with production means, which is subsequently referred to as apparatuses 22, 24, 26, 28, 30. Besides a producing service provider, a suitable service provider is equally an engineer's office, for example, which does not manufacture the product but rather performs analyses, e.g. flowing analyses and the like, to prepare for production or to accompany production. These and other conceivable services and apparatuses 22-30 provided for the purpose of performing said services are intended to be considered covered by the description which follows when reference is made to "production", the installation 20 and the or each apparatus 22-30 which the latter includes.

To allow third parties to arrange production of a part, the rights owner has to date transferred elements of its intellectual property 14-18 in its influence area 12 to the operator of the installation 20 from its influence area 10. In principle, any medium is suitable for this purpose, and if the transfer of blueprints, for example, can initially be assumed historically, it is usually electronic data, that is to say CAD, CAM, CAE data etc., for example, that are interchanged today.

When the intellectual property 14-18 of the rights owner is available in the influence area 12 of the operator of the installation 20, the latter can proceed with the extraneous intellectual property 14-18 at its own discretion, in principle. The rights owner's scope of influence is limited to contractual arrangements with the operator of the installation 20 and the implementability thereof commensurate with said operator, which is often inadequate for the rights owner.

Figure 2:
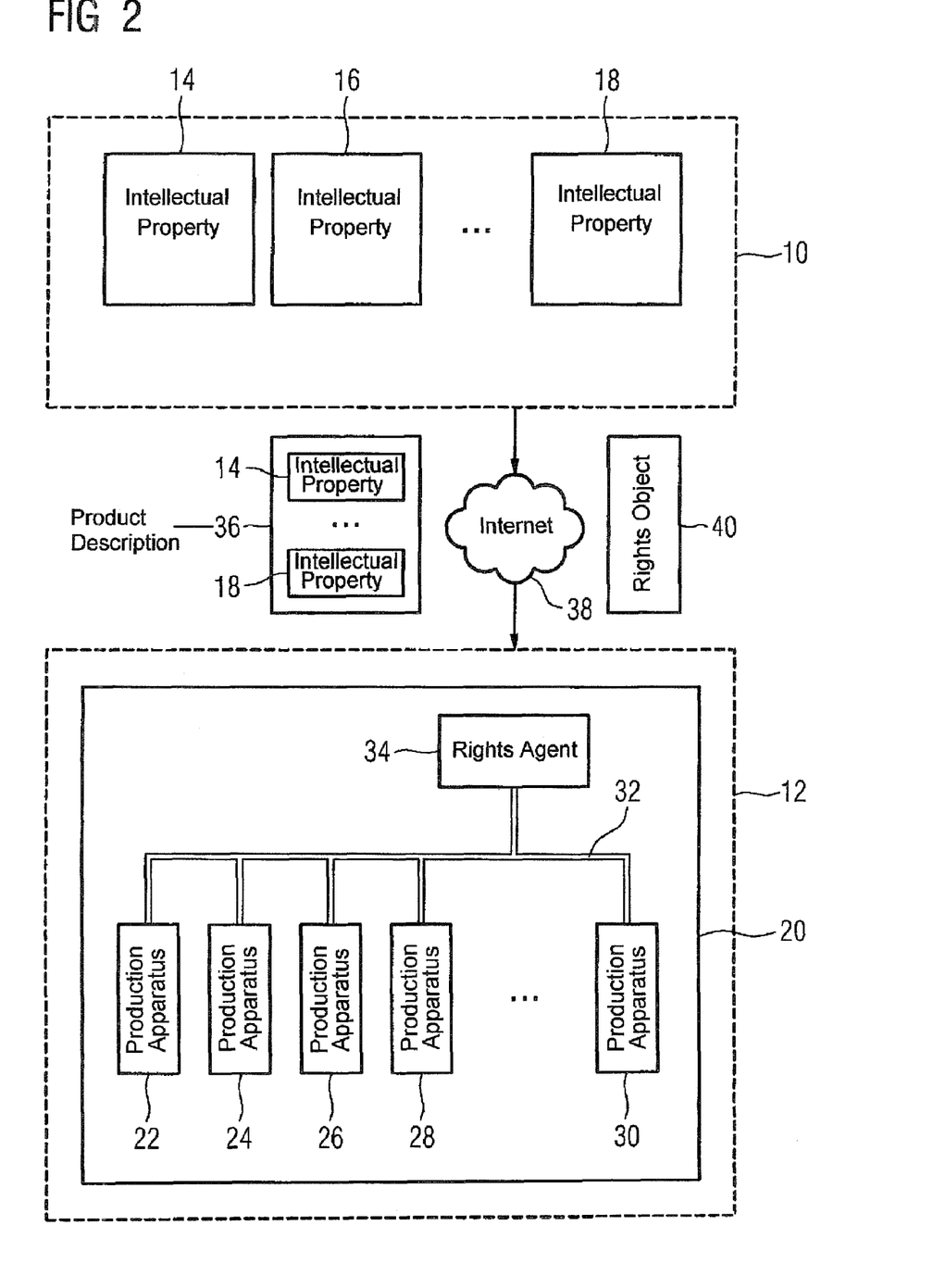
FIG. 2 shows additional details of the diagram shown in FIG. 1.

The illustration in FIG. 2 repeats essential aspects from FIG. 1, the influence area 10 of the rights owner also being able to be regarded as a representation of the rights owner itself and accordingly the influence area 12 of the operator of the installation 20 also being able to be regarded as a schematic representation of the operator itself. Accordingly, the reference symbols introduced are subsequently also used for the rights owner 10 and the operator/contractor 12.

On the part of the operator, the apparatuses 22-30 covered by the installation 20 have a communicative link between them for transmitting data to said apparatuses, but also for data interchange among one another, e.g. in the manner of a bus 32, particularly a field bus. In addition, the installation 20 has at least one associated superordinate unit in a manner of a control station or what is known as a server, which includes at least the functionality of a rights agent and is accordingly referred to as rights agent 34 below for short. In a departure from the illustration in FIG. 2, the rights agent 34 may also be covered by one of the apparatuses 22-30 and implemented in a control portion which is associated with each apparatus 22-30, but which is not shown separately. In each case, the rights agent 34 acts as a unit dedicated to rights management in a production environment, namely the production environment with a number of communicatively connected apparatuses 22-30. If the rights agent 34 is in the form of a separate subscriber on the bus 32, it is a rights agent 34 in the form of a distributed network component.

If the rights owner 10 wishes to have a product produced, for example in a certain number, by the operator 12 (contractor) in line with the scenario outlined at the outset, he transmits a portion of his intellectual property 14-18 relating to this in the form of a product description 36. The product description 36 is transmitted electronically, e.g. by using today's customary means of data interchange, particularly the internet 38. For such a transmission, the product description 36 is encrypted, specifically using a rights object 40. Product description 36 and rights object 40 are processed by the rights agent 34 such that the rights agent 34 uses the rights object 40 to access the product description 36 and forwards data contained therein to the or individual apparatuses 22-30.

Figure 3:
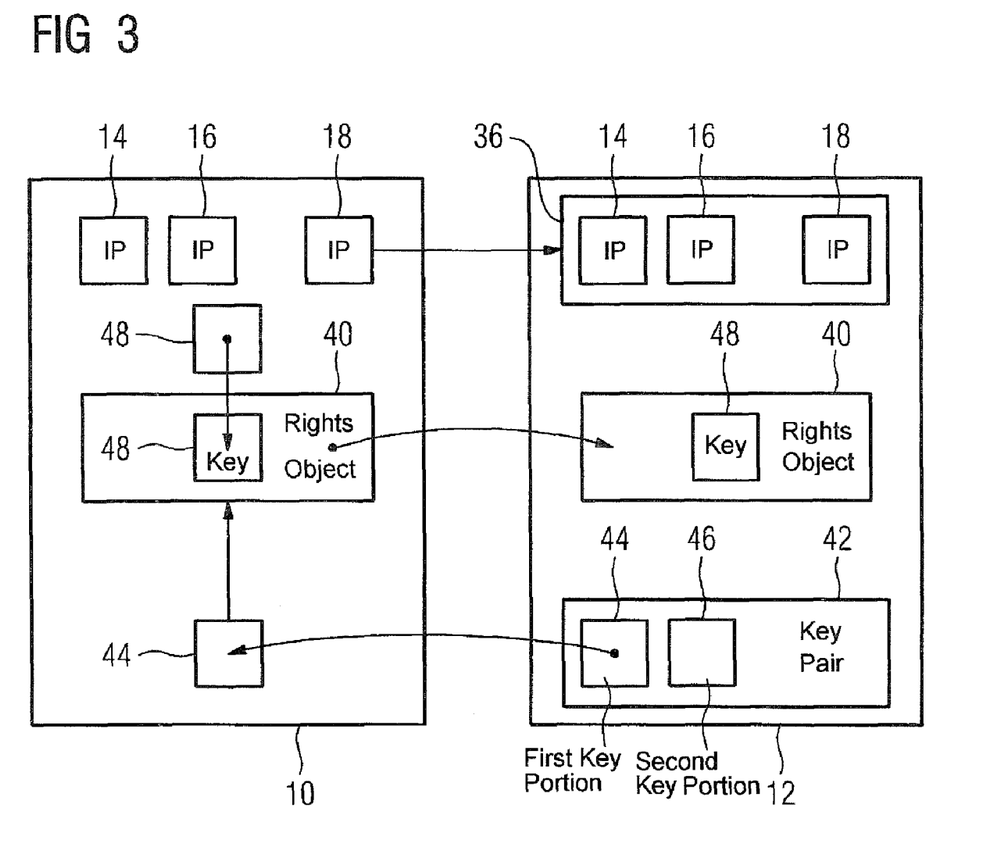
FIG. 3 shows in form of a schematic diagram encryption of a product description with intellectual property of the rights owner using a rights object.

The text below first of all uses FIG. 3 to provide a more detailed explanation of the encryption of the product description 36 using a rights object 40: the service provider 12 first of all produces a key pair 42, from which a first key portion 44 is transmitted to the rights owner 10. The associated second key portion 46 remains with the service provider 12. The key pair 42 is advantageously an asymmetric key, and the first key portion 44 transmitted to the rights owner 10 is advantageously the public portion of such a key pair 42. The rights owner 10 encrypts the intellectual property 14-18 which is to be transmitted using a key 48 of its choice and transmits the intellectual property 14-18 encrypted in this manner to the service provider 12 as a product description 36. A rights object 40 associated with the product description 36 contains this key 48, but is for its part encrypted using the key 44 previously obtained from the service provider 12. The rights object 40 is likewise transmitted to the service provider 12, wherein the service provider 12, as an authorized recipient, also has the second key portion 46, which can be used to decrypt the rights object 40 and hence to access the key 48 which the latter includes. This key 48 can also be used to access the intellectual property 14-18 which the product description 36 includes. The measures and method steps described above take place automatically, at least on the part of the service provider 12, specifically under the control of the rights agent 34. The key 48 chosen by the rights owner 10 for encrypting the intellectual property 14-18 therefore remains secret and is normally not accessible even to natural persons associated with the service provider 12.

The rights object 40 is linked to the product description 36 and defines the scope of use of the product description 36 which has been approved or granted from the service provider 12 as part of the agreement concluded or to be concluded between the rights owner 10 and the service provider 12. To protect the intellectual property 14-18 of the rights owner 10 in the best possible way, the invention now proposes measures to ensure that individual services can be provided only on selected apparatuses 22-30 (FIG. 2) and, on these apparatuses, also only to the extent approved by the rights owner 10. In other words, it is necessary to ensure that the product description 36 or respective relevant portions thereof can be used only on an approved apparatus 22-30. The way to ensure this link between the product description and precisely one respective apparatus 22-30 using the approach based on the invention is explained with reference to FIG. 4.

The rights agent 34 "knows" or receives from each connected apparatus 22 an identifier 50 in the manner of a fingerprint, subsequently also referred to merely as "fingerprint 50". The identifier 50 acting as a fingerprint can be attributed to data which make the respective apparatus 22 distinguishable from other apparatuses 22-30 (FIG. 2). Suitable such data are a network address from the respective apparatus 22-30 on the bus 32 (FIG. 2) or a code for a processing unit which the apparatus 22 includes in a manner of a processor or the like, that is to say a CPU-Id, for example. Multiple instances of such data can be combined in order to make the fingerprint 50 even more explicit.

Figure 4:
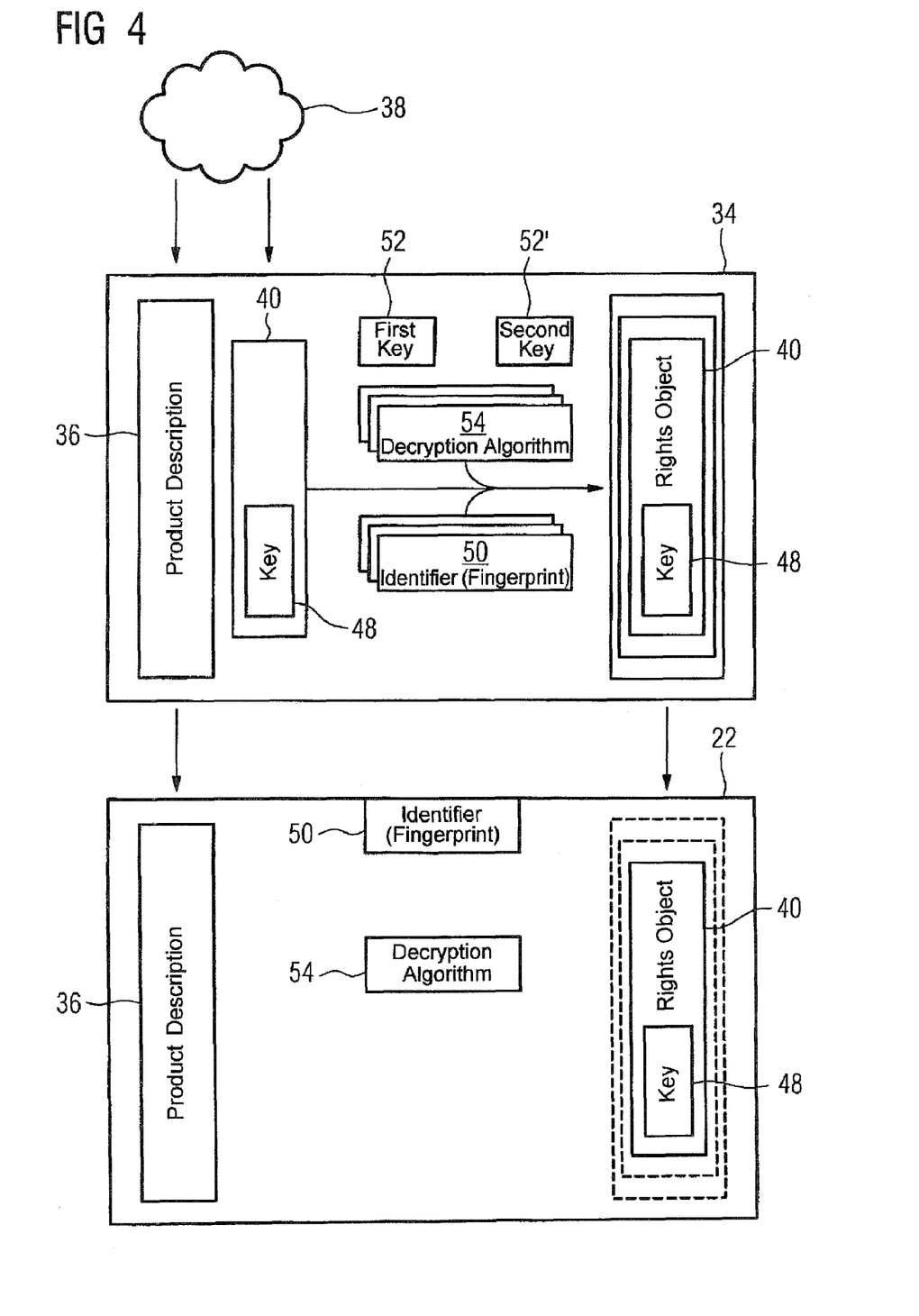
FIG. 4 shows a schematic diagram of an apparatus for processing data combined with the method according to the invention.

The rights agent 34 generates a first and a second symmetric key 52, 52'. The first key 52 is generated using the identifier 50, that is to say corresponds to the identifier or is obtained therefrom on the basis of a prescribed formation rule, for example. In contrast, the second key 52', as a secret key, is independent of the identifier 50. In addition, the rights agent 34 generates a decryption algorithm 54 which is provided for the use of each second and secret key 52'. The decryption algorithm 54 itself includes the second key 52', which is provided for the decryption. The respective decryption algorithm 54 is transmitted to the individual apparatuses 22-30 and connected thereto for operation.

During operation, the rights agent 34 receives a product description 36 which is sent by the rights owner 10 (FIG. 2) and encrypted by the latter using the key 48 which is not known to the service provider 12 (FIG. 12). Authorized access to the product description 36 requires the rights object 40 received independently of this, said rights object 40 for its part being encrypted (cf. illustration in FIG. 3 and associated explanation) and containing the key 48 for accessing the data which the product description 36 includes.

If the rights agent 34 now uses its second key portion 46 (FIG. 2) to decrypt the rights object 40 and uses the then accessible key 48 contained therein to decrypt the product description 36 and forwards the latter directly to an apparatus 22, the intellectual property 14-18 which the product description 36 includes is located there in unprotected form. To prevent this, provision is made for the rights agent 34 to encrypt the rights object 40 and then to transmit the rights object 40 encrypted in this manner to the or each apparatus 22 and to forward the product description 36 in the originally obtained, encrypted form.

For this case, the encryption of the rights object 40 by the rights agent 34 is a two-stage process (illustrated in FIG. 4 by the double frame around the rights object 40). Firstly, the rights object 40 has been encrypted using the symmetric key 52, derived from the fingerprint 50, of that apparatus 22 (first or inner frame) to which the rights object 40 needs to transmitted. Secondly, the rights object 40 has additionally been encrypted using the second and secret symmetric key 52' (second or outer frame). Advantageously, the encryption is performed in the order described, that is to say first of all using the key 52 derived from the fingerprint 50 and then using the second key 52'. The resultant encapsulation (shown by the aforementioned frames) has the advantage that the fingerprint 50 is insufficient to decrypt the rights object 40, even if an unauthorized party obtains said fingerprint from the respective apparatus. In addition—or in the case of the order shown as preferred above, first of all—this is because decryption using the decryption algorithm 54 is required. Although the second key 52' required for this purpose is contained in the decryption algorithm 54 itself, it is hidden therein in line with inherently known approaches, e.g. white-box cryptography (Chow, Eisen, van Oorschot; 2002).

The result of this is that the use of the fingerprint produces a link to the intended apparatus, and that at least the encryption with the second and secret key 52' cannot be lifted without considerably complexity. Hence, an attacker can succeed neither through unauthorized reading of the fingerprint 50 nor through unauthorized reading of the decryption algorithm 54 or through a subsequent attempt to execute the latter in another environment, e.g. an inherently similar apparatus but one which has a different fingerprint 50.

If one of the apparatuses 22 receives a product description 36, or relevant portions thereof, which was originally obtained from the rights owner 10, the rights object 40 thus has two-stage encryption by the rights agent 34. The rights object 40 continues to contain the key 48 which is required for decrypting the transmitted product description 36, that is to say the intellectual property 14-18. As soon as the rights object 40 and the intellectual property 14-18 are available on the apparatus 22-30, the rights object 40 is first of all decrypted (outer frame shown in dashes) using the decryption algorithm 54 (which contains the key itself that is to be used for the purpose, specifically in "hidden form"—white box) generated by the rights agent 34. The next stage of the encryption is then resolved (inner frame shown in dashes), specifically using the first key 52, derived from the fingerprint 50 of the respective apparatus 22-30. This allows access to the rights object 40 and the key 48 contained therein. This key 48 can be used in the last stage to access the intellectual property 14-18 which the product description 36 includes.

The invention can therefore be illustrated briefly as follows: a method and at least bipartite functionality for combining data with an apparatus which is provided for processing the data are specified, with the following steps: determining an identifier 50 which relates to the apparatus 22-30; generating a first and a second key 52, 52', wherein the first key 52 is generated using the identifier 50, and the second key 52', as a secret key, is independent of the identifier 50; generating a decryption algorithm 54 provided for use of the second key 52' and providing the decryption algorithm 54 for the apparatus 22-30 too; encrypting a rights object 40, which allows access to the data, using the first key 52 and the second key 52' on which the decryption algorithm 54 is based; transmitting the data and the rights object 40 to the apparatus 22-30; decrypting the rights object 40 by means of the apparatus 22-30 using the key generated from the identifier 50 thereof and using the decryption algorithm 54 provided therefor and decrypting the data using a key 48 which the decrypted rights object 40 includes. This multistage encryption of the rights object 40 has the advantage that, even in the event of unauthorized access to the respective apparatus 22-30, the intellectual property 14-18 which the data include is not accessible without an excessively high level of complexity.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for combining data and for processing the data with an apparatus, comprising the steps of:
   determining an identifier associated with the apparatus;
   generating a first key by using the identifier and a second secret key, which is independent of the identifier;
   generating a decryption algorithm to be used for the second key and providing the decryption algorithm to the apparatus;
   encrypting a rights object, which allows access to the data, using the first key and the second secret key;
   transmitting the data and the rights object to the apparatus;

decrypting the rights object with the apparatus by using the identifier associated with the apparatus and the decryption algorithm associated with the apparatus; and decrypting the data using a key selected by a rights owner and included in the decrypted rights object.

2. The method of claim 1, wherein the decryption algorithm includes the second secret key in hidden form.

3. The method of claim 2, wherein the second secret key is hidden in the decryption algorithm using a White-Box Cryptography method.

4. The method of claim 1, wherein the decryption algorithm is transferred to a memory and provided to the apparatus by connecting the memory to the apparatus.

5. The method of claim 4, wherein the decryption algorithm is configured
   to be executed only on the apparatus having the identifier used for encryption.

6. The method of claim 1, wherein the data comprise a product description representing intellectual property of a rights owner.

7. The method of claim 1, wherein the apparatus comprises a drive mechanism.

8. A system for combining data and processing the data with an apparatus, the system comprising a rights agent which is configured to:
   determine an identifier associated with the apparatus;
   generate a first key by using the identifier and a second secret key, which is independent of the identifier;
   generate a decryption algorithm to be used for the second key and providing the decryption algorithm to the apparatus;
   encrypt a rights object, which allows access to the data, using the first key and the second secret key; and
   transmit the data and the rights object to the apparatus.

9. The system of claim 8, wherein the rights agent performs rights management in a production environment.

10. The system of claim 8, wherein the rights agent performs rights management in a distributed network component.

11. The system of claim 8, wherein the apparatus decrypts the rights object with by using the identifier associated with the apparatus and the decryption algorithm associated with the apparatus; and the data using a key selected by a rights owner and included in the decrypted rights object.

12. A computer program embodied in a non-transitory computer-readable medium, said program when loaded into computer memory and executed on a computer, causing the computer to execute a method for combining data and for processing the data with an apparatus, the method comprising the steps of:
   determining an identifier associated with the apparatus;
   generating a first key by using the identifier and a second secret key, which is independent of the identifier;
   generating a decryption algorithm to be used for the second key and providing the decryption algorithm to the apparatus;
   encrypting a rights object, which allows access to the data, using the first key and the second secret key;
   transmitting the data and the rights object to the apparatus;
   decrypting the rights object with the apparatus by using the identifier associated with the apparatus and the decryption algorithm associated with the apparatus; and
   decrypting the data using a key selected by a rights owner and included in the decrypted rights object.

13. A non-transitory computer-readable data storage medium comprising a computer program which, when loaded into computer memory and executed on a computer, causes the computer to execute a method for combining data and for processing the data with an apparatus, the method comprising the steps of:
   determining an identifier associated with the apparatus;
   generating a first key by using the identifier and a second secret key, which is independent of the identifier;
   generating a decryption algorithm to be used for the second key and providing the decryption algorithm to the apparatus;
   encrypting a rights object, which allows access to the data, using the first key and the second secret key;
   transmitting the data and the rights object to the apparatus;
   decrypting the rights object with the apparatus by using the identifier associated with the apparatus and the decryption algorithm associated with the apparatus; and
   decrypting the data using a key selected by a rights owner and included in the decrypted rights object.

* * * * *

UNITED STATES PATENT AND TRADEMARK OFFICE
CERTIFICATE OF CORRECTION

PATENT NO. : 8,239,678 B2
APPLICATION NO. : 12/614783
DATED : August 7, 2012
INVENTOR(S) : Jorge Cuellar et al.

Page 1 of 1

It is certified that error appears in the above-identified patent and that said Letters Patent is hereby corrected as shown below:

Column 9, line 42, Claim 11: change "object with by using" to --object by using--
Column 10, line 1, Claim 11: change "and the data" to --and decrypts the data--

Signed and Sealed this
Eleventh Day of September, 2012

David J. Kappos
*Director of the United States Patent and Trademark Office*